Aug. 12, 1958

A. MILLER 2,847,231

TRAILER LOAD EQUALIZER

Filed Sept. 9, 1957

Albert Miller
INVENTOR.

Aug. 12, 1958　　　　A. MILLER　　　　2,847,231
TRAILER LOAD EQUALIZER
Filed Sept. 9, 1957　　　　　　　　　　2 Sheets-Sheet 2
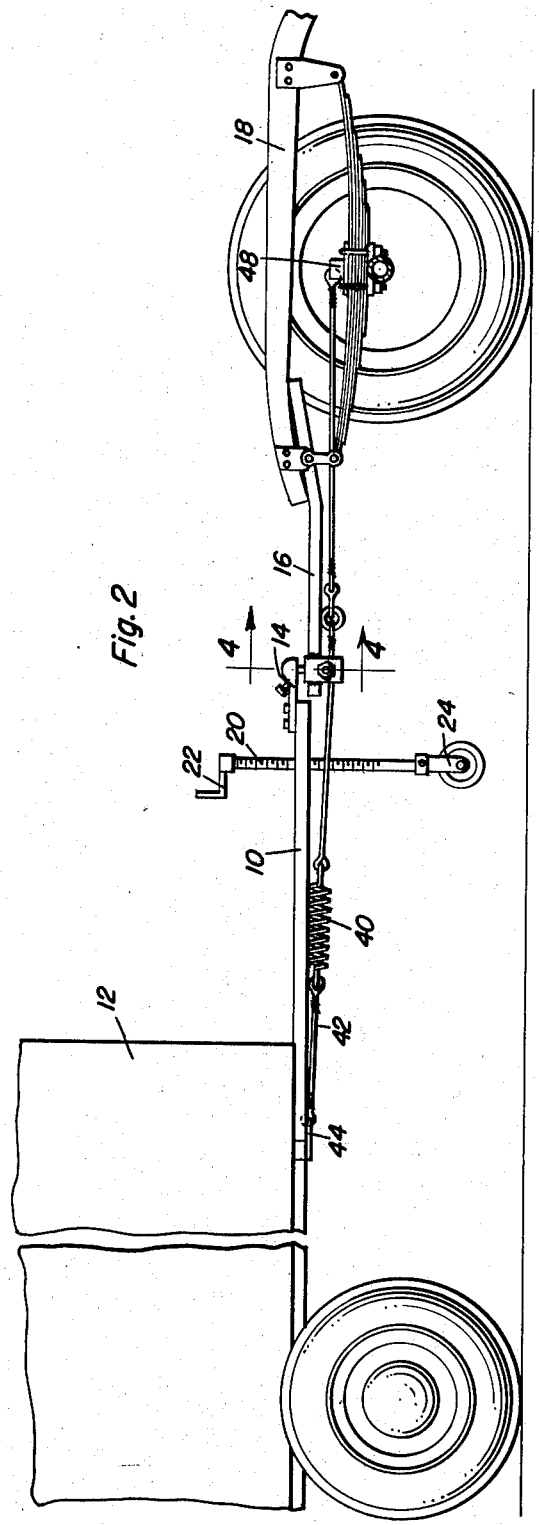
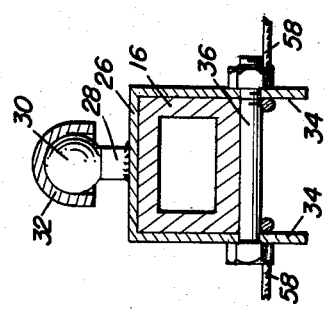
Albert Miller
　　　INVENTOR.

United States Patent Office 2,847,231
Patented Aug. 12, 1958

2,847,231

TRAILER LOAD EQUALIZER

Albert Miller, Victorville, Calif.

Application September 9, 1957, Serial No. 682,838

4 Claims. (Cl. 280—483)

This invention comprises a novel and useful trailer load equalizer and more particularly relates to a flexible device adapted to resiliently connect with the rear axle of a tractor vehicle and the front portion of a trailer vehicle for exerting an upward thrust upon the trailer hitch coupling the trailer tongue to the tractor vehicle drawbar.

The primary purpose of this invention is to provide a resilient tensioning device which may be readily and conveniently coupled to a tractor vehicle and a trailer vehicle in an improved manner in order to exert an upward thrust upon the connection of the trailer tongue with the tractor vehicle drawbar and thus lessen the load placed upon the drawbar by the tongue of the trailer vehicle.

A further object of the invention is to provide a device in accordance with the foregoing object which shall be constructed entirely of flexible tension members, will readily accommodate itself to changing angular relations of the tractor and trailer units, and shall exert a resilient upward pressure upon the connection between the tractor and trailer for relieving this connection of some of the load of the trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of the arrangement of Figure 1, parts being broken away;

Figure 3:
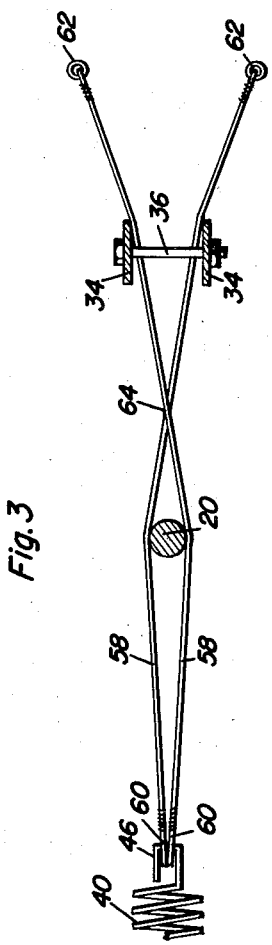

Figure 3 is a top plan view on an enlarged scale of a portion of the device, and illustrating more particularly the pair of rearward tension members and their connection to the resilient means and their operative association with the retractible support of the trailer vehicle and the U-brackets by which the trailer hitch is secured to the drawbar of the tractor vehicle; and Figure 4 is a vertical transverse sectional detail view taken on an enlarged scale substantially upon the plane indicated by the section line 4—4 of Figure 2.

Figure 1:
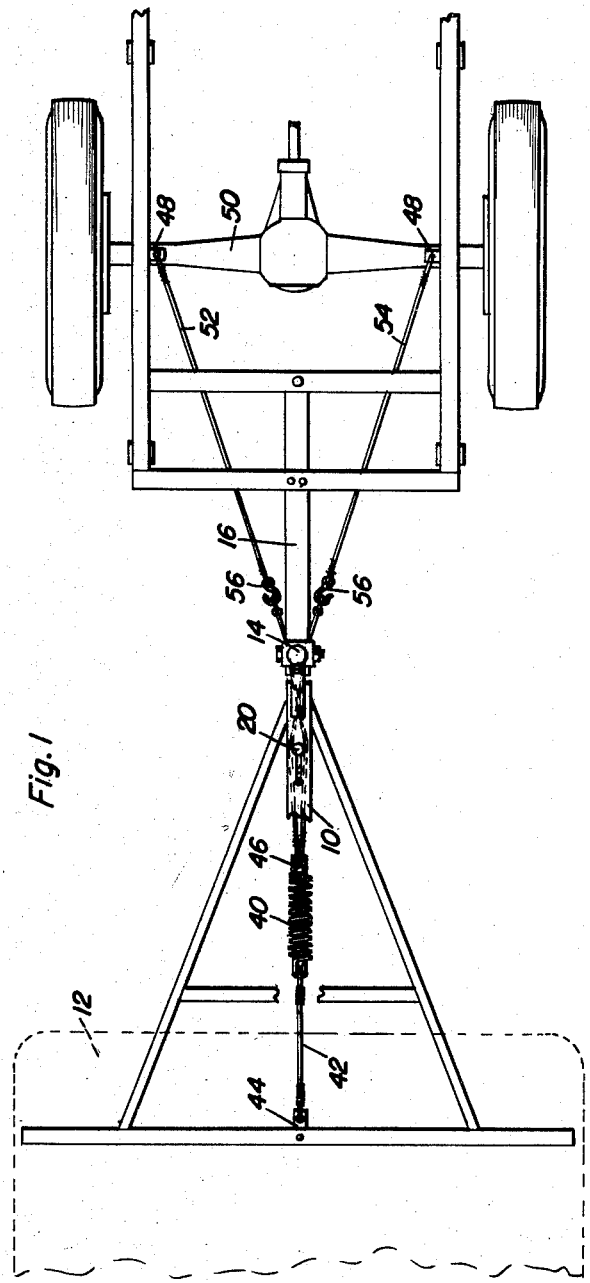
Figure 1 is a somewhat diagrammatic top plan view showing a portion of the rear end of a tractor vehicle and the front end of a trailer vehicle together with the tractor drawbar and the trailer tongue and the trailer hitch connecting these members, and with the flexible tensioning device operatively connected to the tractor and trailer unit.

In one conventional type of tractor-trailer combination, shown particularly in Figures 1 and 2, the tongue 10 of a trailer 12 is detachably coupled as by a trailer hitch 14 to the drawbar 16 carried by the rear portion of the chassis or frame 18 of a tractor vehicle. In the conventional form of trailer illustrated, the tongue receives therethrough a vertically extending externally threaded retractible support 20 having an operating crank 22 for raising or lowering the same, the support being provided with a supporting wheel assembly 24 at its lower end. In such tractor-trailer combinations, it frequently happens that the load of the trailer imparts an excessively heavy weight upon the drawbar 16 and the rear portion of the frame or chassis 18 of the tractor vehicle. It is the purpose of the present invention to provide a device which may easily and quickly be connected with a tractor and trailer in such a manner as to resiliently support a part of this load and thereby relieve the trailer hitch and the tractor drawbar from some of the vertical load which would otherwise be opposed thereon.

As will be seen more clearly from Figures 2 and 4, the rearward portion of the tractor drawbar 16 is substantially rectangular in cross-section and has thereon a U-shaped bracket or U-bracket 26 from which extends an upwardly projecting stem 28 having a ball 30 thereon constituting a coupling member carried by the drawbar of the tractor for receiving a complementary socket member 32 forming a part of the trailer hitch 14. The U-shaped bracket 26 as shown has a pair of depending substantially parallel legs 34 which project downwardly beneath the bottom surface of the drawbar 16 and which are secured together and are clamped to the drawbar as by a transverse fastening bolt 36. Use is made of this construction and of the support member 20 to effectively mount a tensioning and supporting device for reducing the vertical component of the load of the trailer upon the tractor drawbar.

This equalizing device comprises a suitable tension coil spring 40 disposed beneath the tongue 10 and in substantial alignment therewith, the rear end of the spring being connected as by a cable, or other flexible member 42 with a suitable bracket 44 mounted upon the frame of the trailer vehicle 12. At its front end, as shown in Figures 1 and 3, the spring 40 has a hook 46 for a purpose to be subsequently set forth.

A pair of suitable brackets 48, see Figures 1, and 2, are mounted in any convenient manner upon the top surface of the rear axle housing 50 forming a part of the tractor vehicle, and adjacent the springs of the same.

A pair of forward flexible tension members 52 and 54 are disposed in inclined relation to each other and at their forward divergent ends are coupled to the brackets 48.

At their rearward ends, the forward tension members are provided with a pair of hooks each indicated at 56, the rearward ends being convergent and closely adjacent to the opposite sides of the drawbar 16 as will be apparent from Figure 1.

A pair of rearward flexible tension members each designated by the numeral 58 is provided, the rear ends of these members having eyes 60 adapted to be engaged upon the hook 46 at the front end of the spring 40, while the forward ends of these rear tension members are provided with eyes or rings 62 adapted to be engaged by the hooks 56 of the forward tension members.

As will now be especially observed from Figure 2, the spring 40 serves to tension the entire system consisting of the cable or flexible member 42 which anchors the springs; the pair of rearward tension members 58 and the pair of forward tension members 52 and 54, thus resiliently urging the above mentioned members into a horizontal common plane. The equalizing device is so mounted, however, that this common plane lies above the bolt 36 of the trailer hitch mounting and therefore the tension of the system is effective to yieldingly urge the bolt 36, the trailer hitch and therefore the tongue and drawbar connection upwardly. Since the opposite ends of the system are secured to the trailer frame and to the rear axle of the tractor vehicle, it is evident that the upward thrust upon the coupling assembly is applied to the rear axle of the tractor vehicle rather than to the drawbar, thereby relieving the latter and the trailer hitch from part of the load of the trailer tongue.

It will be observed by reference to Figure 3 that the rearward ends of the rear pair of tension members 58 are disposed in contacting side by side relation as they are engaged upon the hook 46 at the front end of the spring 40. However, the rear portions of these tension members diverge as they are passed on opposite sides of the support 20 to exert a yielding lateral pressure upon the sides of the support. Forwardly of the support the rear tension members cross each other as shown at 64 so that their forward portions are received between the depending legs 34 of the U-bracket 26 and bear laterally against the latter with a yielding pressure, and also lift upwardly against the underside of the bolt 36, as will be clearly apparent from Figure 4.

At their forward portions, the front ends of the rearward tension members are sharply divergent as they approach their eye 62 where they are coupled to the hooks 56 of the forward tension members 52 and 54. It will be observed that in their main portion the rearward pair of tension members 58 lie beneath the tongue 10 and the drawbar 16, while their forward divergent portions extend laterally beyond the sides of the drawbar 16 and into alignment with the divergent forward tension members 52 and 54 as shown in Figure 1.

The device is highly flexible in its nature, will readily accommodate itself to changes in the angularity of the tractor with respect to the trailer vehicle as when negotiating curves or the like, and since the two ends of the system are both mounted above the bolt 36, the fixed tensioning of the device by the spring 40 exerts an upward pressure through the bolt 36 against the coupling of the trailer tongue to the tractor drawbar to thereby lessen the load applied to the tractor drawbar by the trailer coupling.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flexible trailer load equalizer for use with a tractor vehicle having a trailer drawbar and a trailer having a tongue coupled to said drawbar by a trailer hitch, comprising a spring secured at its rear end to said trailer, a pair of rear flexible tension members disposed beneath said tongue and secured at their rear ends to the front end of said spring, a pair of forward flexible tension members disposed beneath said drawbar and having a rear end of each connected to a forward end of said rear tension members and having their forward ends divergent, means securing each divergent forward end of said forward tension member to the rear axle housing of said tractor vehicle, one of said pair of tension members being operatively engaged with said draw-bar and tongue and exerting a resilient upward force thereon.

2. The combination of claim 1 wherein said trailer hitch includes a U-shaped bracket by which it is secured to said drawbar, said bracket having legs depending beneath said drawbar, said rearward tension members being retained between said legs and exerting an upward thrust upon said drawbar.

3. The combination of claim 2 wherein said tongue has a depending retractible support, said rearward tension members yieldingly engaging and being separated by opposite sides of said support.

4. The combination of claim 2 wherein said tongue has a depending retractible support, said rearward tension members engaging opposite sides of said support, said rearward tension members having their forward portions crossing each other between said support and said legs whereby said divergent forward ends and said resilient means will resiliently urge said forward tension members laterally against said support and said legs.

References Cited in the file of this patent

UNITED STATES PATENTS

| 2,507,189 | Arehart | May 9, 1950 |
| 2,546,206 | Arehart | May 27, 1951 |

FOREIGN PATENTS

| 541,887 | Germany | Jan. 18, 1933 |